United States Patent
Marcoccia et al.

(10) Patent No.: US 10,710,930 B2
(45) Date of Patent: *Jul. 14, 2020

(54) SURFACE ENHANCED PULP FIBERS IN FIBER CEMENT

(71) Applicant: Domtar Paper Company, LLC, Fort Mill, SC (US)

(72) Inventors: Bruno Marcoccia, Charlotte, NC (US); Harshad Pande, Pointe-Claire (CA); Brian Wester, Roy, WA (US)

(73) Assignee: DOMTAR PAPER COMPANY, LLC, Fort Mill, SC (US)

( * ) Notice: Subject to any disclaimer, the term of this patent is extended or adjusted under 35 U.S.C. 154(b) by 377 days.

This patent is subject to a terminal disclaimer.

(21) Appl. No.: 15/120,221

(22) PCT Filed: Feb. 20, 2015

(86) PCT No.: PCT/US2015/016858
§ 371 (c)(1),
(2) Date: Aug. 19, 2016

(87) PCT Pub. No.: WO2015/127233
PCT Pub. Date: Aug. 27, 2015

(65) Prior Publication Data
US 2017/0226009 A1  Aug. 10, 2017

Related U.S. Application Data

(60) Provisional application No. 61/942,708, filed on Feb. 21, 2014.

(51) Int. Cl.
C04B 18/24 (2006.01)
C04B 28/02 (2006.01)
C04B 111/40 (2006.01)

(52) U.S. Cl.
CPC ............ C04B 18/241 (2013.01); C04B 28/02 (2013.01); *C04B 2111/40* (2013.01); *Y02W 30/97* (2015.05)

(58) Field of Classification Search
CPC ... C04B 18/241; C04B 28/02; C04B 2111/40; Y02W 30/97
See application file for complete search history.

(56) References Cited

U.S. PATENT DOCUMENTS 3,098,785 A  7/1963 Meiler
3,388,037 A  6/1968 Asplund
(Continued)

FOREIGN PATENT DOCUMENTS

AU  2015218812  7/2017
AU  2013305802  8/2017
(Continued)

OTHER PUBLICATIONS

Pande, Harshad; Applicant Initiated Interview Summary for U.S. Appl. No. 13/836,760, filed Mar. 15, 2013, dated Sep. 27, 2017, 3 pgs.
(Continued)

*Primary Examiner* — Shuangyi Abu Ali
(74) *Attorney, Agent, or Firm* — Norton Rose Fulbright US LLP

(57) ABSTRACT

The present invention relates to a method of making a fiber-reinforced cementitious composite material which finds widespread applicability in a variety of construction and related applications. The composite comprises cellulosic fibrous material in order to provide the composite with the desired performance characteristics. Notably, at least a portion of the cellulosic fibrous material comprises surfaced enhanced pulp fiber, which desirably enhances the processing characteristics of the material, as well enhancing the
(Continued)

characteristics of the finished composite product. The method of making a fiber-reinforced cementitious composite comprising the steps of providing a cementitious composition, and providing cellulosic fibrous material. The present method further includes blending the cementitious composition and the cellulosic fibrous material to form the cementitious composite. The surface enhanced pulp fiber preferably comprises approximately 1-10%, by weight, of the cellulosic fibrous material, and the cellulosic fibrous material exhibits an enhanced Bauer-McNett long fiber fraction. The cellulosic fibrous material preferably exhibits at least a 10% increase in length-weighted average fiber length (LWAFL), in comparison to a cellulosic fibrous material which is devoid of surface enhanced pulp fiber. The cellulosic fibrous material requires relatively reduced refining energy, in comparison to a cellulosic fibrous material which is devoid of surface enhanced pulp fiber, to reach a predetermined freeness CSF (Canadian Standard Freeness) value.

23 Claims, 3 Drawing Sheets

(56) References Cited

U.S. PATENT DOCUMENTS

| | | | |
|---|---|---|---|
| 3,708,130 | A | 1/1973 | Perry |
| 3,794,558 | A | 2/1974 | Back |
| 3,920,508 | A | 11/1975 | Yonemori |
| 4,012,279 | A | 3/1977 | Selander |
| 4,247,362 | A | 1/1981 | Williams |
| 4,635,864 | A | 1/1987 | Peterson |
| 5,248,099 | A | 9/1993 | Lahner et al. |
| 5,695,136 | A | 12/1997 | Rohden |
| 5,731,080 | A | 3/1998 | Cousin et al. |
| 5,824,364 | A | 10/1998 | Cousin et al. |
| 5,954,283 | A | 9/1999 | Matthew |
| 6,156,118 | A | 12/2000 | Silenius et al. |
| 6,165,317 | A | 12/2000 | Sabourin |
| 6,251,222 | B1 | 6/2001 | Silenius et al. |
| 6,296,736 | B1 | 10/2001 | Hsu et al. |
| 6,375,974 | B1 | 4/2002 | Ito et al. |
| 6,599,391 | B2 | 7/2003 | Silenius et al. |
| 6,773,552 | B1 | 8/2004 | Albert et al. |
| 6,861,380 | B2 | 3/2005 | Garnier et al. |
| 6,887,350 | B2 | 5/2005 | Garnier et al. |
| 6,935,589 | B1 | 8/2005 | Matthew |
| 6,955,309 | B2 | 10/2005 | Matthew et al. |
| 7,381,294 | B2 | 6/2008 | Suzuki et al. |
| 7,624,879 | B2 | 12/2009 | Frances |
| 7,741,234 | B2 | 6/2010 | Smith |
| 7,942,964 | B2 | 5/2011 | Luo et al. |
| 9,879,361 | B2 * | 1/2018 | Pande ............... D21B 1/04 |
| 9,920,484 | B2 * | 3/2018 | Marcoccia ........... D21H 11/16 |
| 2002/0059886 | A1 | 5/2002 | Merkley et al. |
| 2002/0069791 | A1 | 6/2002 | Merkley et al. |
| 2004/0112558 | A1 | 6/2004 | Garnier et al. |
| 2004/0112997 | A1 | 6/2004 | Matthew et al. |
| 2004/0180184 | A1 | 9/2004 | Fillion |
| 2004/0241350 | A1 | 12/2004 | Koga et al. |
| 2005/0194477 | A1 | 9/2005 | Suzuki |
| 2006/0006264 | A1 | 1/2006 | Sabourin |
| 2007/0164143 | A1 | 7/2007 | Sabourin et al. |
| 2008/0148999 | A1 | 6/2008 | Luo et al. |
| 2009/0145562 | A1 | 6/2009 | Nguyen |
| 2009/0145842 | A1 | 6/2009 | Frances |
| 2009/0162602 | A1 | 6/2009 | Cottier et al. |
| 2010/0218908 | A1 | 9/2010 | Silenius et al. |
| 2010/0288456 | A1 | 11/2010 | Westland et al. |
| 2011/0277947 | A1 | 11/2011 | Hua et al. |
| 2012/0007363 | A1 | 1/2012 | Wang |
| 2012/0012031 | A1 | 1/2012 | Husband et al. |
| 2013/0202870 | A1 | 8/2013 | Malmborg et al. |
| 2014/0057105 | A1 | 2/2014 | Pande et al. |
| 2016/0333524 | A1 | 11/2016 | Pande |
| 2016/0340802 | A1 | 11/2016 | Pande |
| 2017/0058457 | A1 | 3/2017 | Marcoccia |

FOREIGN PATENT DOCUMENTS

| | | |
|---|---|---|
| CA | 2883161 | 3/2017 |
| CN | 1516768 | 7/2004 |
| CN | 1718914 | 1/2006 |
| CN | 101691700 | 4/2010 |
| CN | 102971462 | 3/2013 |
| CN | 103590283 | 2/2014 |
| EP | 2220291 | 5/1917 |
| JP | H02229747 | 9/1990 |
| JP | H03122038 | 5/1991 |
| JP | H04194097 | 7/1992 |
| JP | H07165456 | 6/1995 |
| JP | H08197836 | 8/1996 |
| JP | H08284090 | 10/1996 |
| JP | H09-124950 | 5/1997 |
| JP | 2002194691 | 7/2002 |
| JP | 2004525284 | 8/2004 |
| JP | 2004360088 | 12/2004 |
| JP | 2007231438 | 9/2007 |
| JP | 2010125694 | 6/2010 |
| JP | 2012526923 | 11/2012 |
| JP | 2015526608 | 9/2015 |
| KR | 1020050086850 | 8/2005 |
| KR | 1020130132381 | 12/2013 |
| RU | 2224060 | 2/2004 |
| RU | 2309211 | 10/2007 |
| RU | 2358055 | 6/2009 |
| WO | WO 96/04424 | 2/1996 |
| WO | WO 98/23814 | 6/1998 |
| WO | WO 02/14606 | 2/2002 |
| WO | 02095129 | 11/2002 |
| WO | WO 2009/038730 | 3/2009 |
| WO | 2012007363 | 1/2012 |
| WO | 2014031737 | 2/2014 |
| WO | 2015127233 | 8/2015 |
| WO | 2015127239 | 8/2015 |

OTHER PUBLICATIONS

Tonoli, et al.; Article entitled: "Effect of fibre morphology on flocculation of fibre-cement suspensions", Cement and Concrete Research 39 (2009) 1017-1022, published on Nov. 1, 2009, 6 pgs.
Marcoccia, Bruno; International Search Report and the Written Opinion for PCT Application No. PCT/US 17/44881, filed Aug. 1, 2017, dated Oct. 18, 2017, 9 pgs.
Marcoccia, Bruno; Notice of Allowance for U.S. Appl. No. 15/120,220, filed Aug. 19, 2016, dated Nov. 6, 2017, 11 pgs.
Pande, Harshad; Final Office Action for U.S. Appl. No. 13/836,760, filed Mar. 15, 2013, dated Jan. 27, 2017, 16 pgs.
Pande, Harshad; Notice of Allowance for Canadian Patent Application No. 2,863,161, filed Aug. 21, 2013, dated Jan. 3, 2017, 1 pg.
Handbook of Pulping and Papermaking, C. Biermann, Academic Press; 2nd Edition (Aug. 5, 1996), p. 145.
Pande, Harshad; Final Office Action for U.S. Appl. No. 13/836,760, filed Mar. 15, 2013, dated May 12, 2016, 10 pgs.
Pande, Harshad; Non-Final Office Action for U.S. Appl. No. 13/836,760, filed Mar. 15, 2013, dated Oct. 15, 2015, 10 pgs.
Pande, Harshad; Restriction Requirement for U.S. Appl. No. 13/836,760, filed Mar. 15, 2013, dated Jul. 16, 2015, 8 pgs.
Teixeira. Article entitled: "Recycled Old Corrugated Container Fibers for Wood-Fiber Cement Sheets"; International Scholarly Research Network 2012(923413): 1-8, 2012, 9 pgs.
Marcoccia, Bruno; International Preliminary Report on Patentability for PCT Application No. PCT/US2015/016865, filed Feb. 20, 2015, dated Aug. 23, 2016, 7 pgs.
Marcoccia, Bruno; International Search Report and Written Opinion for PCT Application No. PCT/US2015/016865, filed Feb. 20, 2015, dated May 20, 2015, 8 pgs.

(56) References Cited

OTHER PUBLICATIONS

Marcoccia, Bruno; International Preliminary Report on Patentability for PCT Application No. PCT/US2015/016858, filed Feb. 20, 2015, dated Aug. 23, 2016, 8 pgs.
Marcoccia, Bruno; International Search Report and Written Opinion for PCT Application No. PCT/US2015/016858, filed Feb. 20, 2015, dated May 15, 2015, 9 pgs.
Marcoccia, Bruno; U.S. Provisional Application entitled: Surface Enhanced Pulp Fibers, Methods of Making Surface Enhanced Pulp Fibers, Products Incorporating Surface Enhanced Pulp Fibers, and Methods of Making Products Incorporating Surface Enhanced Pulp Fibers , having U.S. Appl. No. 61/692,880, filed Aug. 24, 2012, 23 pgs. (Copy not required—see MPEP § 609.04(a) (citing "Waiver of the Copy Requirement").).
Marcoccia, Bruno; U.S. Provisional Application entitled: Surface Enhanced Pulp Fibers at the Substrate Surface: Solutions, Methods of Application and Enhanced Properties , having U.S. Appl. No. 61/942,694, filed Feb. 21, 2014, 60 pgs. (Copy not required—see MPEP § 609.04(a) (citing "Waiver of the Copy Requirement").).
Marcoccia, Bruno; U.S. Provisional Application entitled: Surface Enhanced Pulp Fibers in Fiber Cement , having U.S. Appl. No. 61/942,708, filed Feb. 21, 2014, 58 pgs. (Copy not required—see MPEP § 609.04(a) (citing "Waiver of the Copy Requirement").).
Marcoccia, Bruno; U.S. Provisional Application entitled: Improved Composition of Lignin and Surface-Enhanced Pulp Fiber, having U.S. Appl. No. 62/189,569, filed Jul. 7, 2015, 5 pgs. (Copy not required—see MPEP § 609.04(a) (citing "Waiver of the Copy Requirement").)
Marcoccia, Bruno; U.S. Patent Application entitled: Surface Enhanced Pulp Fibers at a Substrate Surface, having U.S. Appl. No. 62/369,362, filed Aug. 1, 2016, 23 pgs. (Copy not required—see MPEP § 609.04(a) (citing "Waiver of the Copy Requirement").).
La Vrykova-Marrain et al., Article entitled: "Characterizing the drainage resistance of pulp and microfibrilla suspensions using hydrodynamic flow measurements", TAPPI's PaperCon 2012 Conference, 38 pgs.
Pal, et al., "A Simple Method for Calculation of the Permeability Coefficient of Porous Media". Tappia Journal, 5(9):10-16, 2006.
Pande, Harshad; International Preliminary Report on Patentability for PCT/US2013/055971, filed Aug. 21, 2013, dated Feb. 24, 2015, 7 pgs.
Pande, Harshad; International Search Report and Written Opinion for PCT/US2013/055971, filed Aug. 21, 2013, dated Oct. 14, 2013, 9 pgs.

Extended European Search Report issued in European Application No. 17195921.6, dated Nov. 20, 2017.
Notice of Grant for Chinese Application No. 201380054919.2, dated Nov. 14, 2017.
Pande, Harshad; Applicant Initiated Interview Summary for U.S. Appl. No. 13/836,760, filed Mar. 15, 2013, dated May 9, 2017, 3 pgs.
Domtar Paper Company, LLC; Notice of Acceptance for Australian application No. 2013306802, flied Feb. 23, 2015, dated Apr. 21, 2017, 3 pgs.
Domtar Paper Company, LLC; Notice of Acceptance for New Zealand application No. 705191, filed Aug. 21, 2013, dated Apr. 13, 2017, 1 pg.
Pande, Harshad; Intention to grant for European patent application No. 13759601,1, filed Aug. 21, 2013, dated Jul. 25, 2017, 45 pgs.
Marcoccia, Bruno; Non-Final Office Action for U.S. Appl. No. 15/120,220, filed Aug. 19, 2016, dated Jul. 13, 2017, 26 pgs.
International Search Report and Written Opinion Issued in PCT Application No. PCT/US2017/057161, dated Dec. 22, 2017.
Notice of Allowance Issued in Chinese Patent Application No. 201580020488.7, dated Apr. 12, 2018.
Office Action Issued in Japanese Application No. 148632, dated Apr. 10, 2018.
Declaration of Harshad Pande and Bruno Marcoccia, filed in U.S. Appl. No. 13/836,760, dated Oct. 12, 2016.
Notice of Reasons for Refusal issued in Japanese Patent Application No. 2018-090071, dated May 15, 2019.
Office Action issued in Indian Patent Application No. 465/KOLNP/2015, dated May 7, 2019.
Office Action issued in Russian Patent Application No. 2018125883/12, dated Mar. 6, 2019.
Demuner et al., "Ultra low intensity refining of eucalyptus pulps." Scientific and technical advances in refining and mechanical pulping 2005.
Joy et al., "Ultra-Low intensity refining of short fibered pulps." African Pulp and Paper Week 2004 retrieved from URL:<https://www.tappsa.eo.za/archive2/APPW_2004/Title2004/Ultra-low_intensity_refining/ultra-low_intensity_refining.html>.
Office Action issued in corresponding European Patent No. 17195921 dated Apr. 17, 2019.
International Search Report and Written Opinion issued in International Patent Application No. PCT/US2019/016590, dated May 23, 2019.

* cited by examiner

SURFACE ENHANCED PULP FIBERS IN FIBER CEMENT

CROSS-REFERENCE TO RELATED APPLICATION

This application is a national phase application under 35 U.S.C. § 371 of International Application No. PCT/US2015/016858, filed Feb. 20, 2015, which claims priority to U.S. Provisional Patent Application Ser. No. 61/942,708, filed on Feb. 21, 2014, the contents of which applications are hereby incorporated by reference as though fully set forth herein.

FIELD OF THE INVENTION

The present invention relates to the use of surface enhanced pulp fibers (SEPF) in fiber cement. The premise here is the use of surface enhanced pulp fibers in fiber cement enhances the manufacture and finished properties of cement board.

BACKGROUND

Fiber cement boards are used in a wide variety of construction applications—including exterior siding, trim, interior ceiling tiles and tile backer board. Manufacturers of these products in North America include James Hardie Co. (HardiePanel, HardieB cker); CertainTeed Corporation (Weatherboard) and Nichiha (Nichiboard).

Fiber cement is made from mixtures of cement and long softwood cellulose fibers. The cellulose fibers play an important role in both the manufacture and the finished product strength of the board. In the manufacturing process, the refined fibers help trap and retain the cement particles to allow the curing and formation of the concrete matrix. In the finished product, the long fibers provide the flexibility and toughness necessary for handling, installation and post installation durability of the board.

Pulp fibers, such as wood pulp fibers, are used in a variety of products including, for example, pulp, paper, paperboard, bio fiber composites (e.g., fiber cement board, fiber reinforced plastics, etc.), absorbent products (e.g., fluff pulp, hydrogels, etc.), specialty chemicals derived from cellulose (e.g., cellulose acetate, carboxymethyl cellulose (CMC), etc.), and other products. The pulp fibers can be obtained from a variety of wood types including hardwoods (e.g., oak, gum, maple, poplar, eucalyptus, aspen, birch, etc.), softwoods (e.g., spruce, pine, fir, hemlock, southern pine, redwood, etc.), and non-woods (e.g., kenaf, hemp, straws, bagasse, etc.). The properties of the pulp fibers can impact the properties of the ultimate end product, such as paper, the properties of intermediate products, and the performance of the manufacturing processes used to make the products (e.g., papermachine productivity and cost of manufacturing). The pulp fibers can be processed in a number of ways to achieve different properties. In some existing processes, some pulp fibers are refined prior to incorporation into an end product. Depending on the refining conditions, the refining process can cause significant reductions in length of the fibers, can generate, for certain applications, undesirable amounts of fines, and can otherwise impact the fibers in a manner that can adversely affect the end product, an intermediate product, and/or the manufacturing process. For example, the generation of fines can be disadvantageous in some applications because fines can slow drainage, increase water retention, and increase wet-end chemical consumption in papermaking which may be undesirable in some processes and applications.

Fibers in wood pulp typically have a length weighted average fiber length ranging between 0.5 and 3.0 millimeters prior to processing into pulp, paper, paperboard, biofiber composites (e.g., fiber cement board, fiber reinforced plastics, etc.), absorbent products (e.g., fluff pulps, hydrogels, etc.), specialty chemicals derived from cellulose (e.g., cellulose acetate, carboxymethyl cellulose (CMC), etc.) and similar products. Refining and other processing steps can shorten the length of the pulp fibers. In conventional refining techniques, fibers are passed usually only once, but generally no more than 2-3 times, through a refiner using a relatively low energy (for example, about 20-80 kWh/ton for hardwood fibers) and using a specific edge load of about 0.4-0.8 Ws/m for hardwood fibers to produce typical fine paper.

SUMMARY OF THE INVENTION

The present invention relates to a method of making a fiber-reinforced cementitious composite material which finds widespread applicability in a variety of construction and related applications. The composite comprises cellulosic fibrous material in order to provide the composite with the desired performance characteristics. Notably, at least a portion of the cellulosic fibrous material comprises surfaced enhanced pulp fiber, which desirably enhances the processing characteristics of the material, as well enhancing the characteristics of the finished composite product.

In accordance with the present invention, a method of making a fiber-reinforced cementitious composite comprising the steps of providing a cementitious composition, and providing cellulosic fibrous material. The present method further includes blending the cementitious composition and the cellulosic fibrous material to form a cementitious composite. As noted, the cellulosic fibrous material advantageously comprises surface enhanced pulp fiber, for enhancing processing and the finished composite product. In one aspect of the present invention, the surface enhanced pulp fiber comprises approximately 1-10%, by weight, of the cellulosic fibrous material. In another aspect, the cellulosic fibrous material exhibits an enhanced Bauer-McNett long fiber fraction.

In another aspect of the present invention, the cellulosic fibrous material exhibits at least a 10% increase in length-weighted average fiber length (LWAFL), in comparison to a cellulosic fibrous material which is devoid of surface enhanced pulp fiber. The cellulosic fibrous material requires relatively reduced refining energy, in comparison to a cellulosic fibrous material which is devoid of surface enhanced pulp fiber, to reach a predetermined freeness CSF (Canadian Standard Freeness) value.

In accordance with the present method, the surface enhanced pulp fiber has a length weighted average fiber length of at least about 0.3 millimeters, and an average hydrodynamic specific surface area of at least about 10 square meters per gram, wherein the number of surface enhanced pulp fibers is at least 12,000 fibers/milligram on an oven-dry basis. In another aspect of the invention, the surface enhanced pulp fiber has a length-weighted average fiber length that is at least 60% of the length-weighted average length of the fibers prior surface enhancement by fibrillation, and an average hydrodynamic specific surface area that is at least 4 times greater than the average specific surface area of the fibers prior to fibrillation. In another aspect, the surface enhanced pulp fibers are refined with an energy input of at least about 300 kilowatt-hours/ton.

These and other embodiments are presented in greater detail in the detailed description which follows.

DETAILED DESCRIPTION

Figure 1:
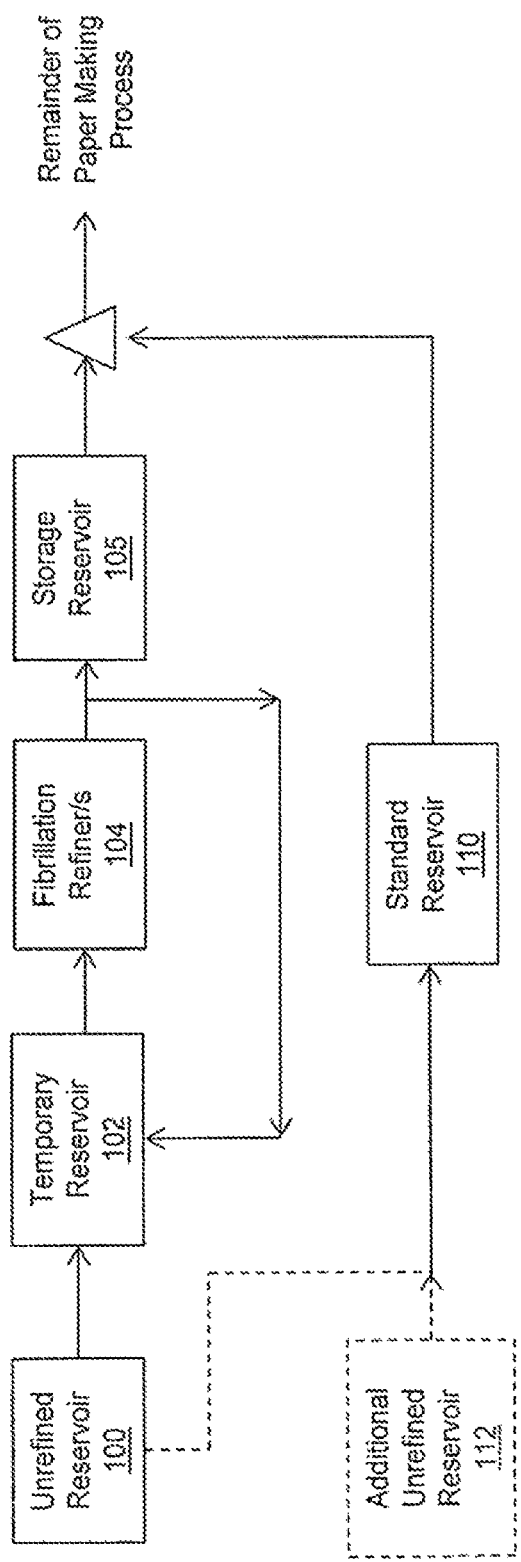
FIG. 1 is a block diagram illustrating a system for making a paper product according to one non-limiting embodiment of the present invention.

The present invention relates to a method of making a fiber-reinforced cementitious composite material which finds widespread applicability in a variety of construction and related applications. The composite comprises cellulosic fibrous material in order to provide the composite with the desired performance characteristics. Notably, at least a portion of the cellulosic fibrous material comprises surfaced enhanced pulp fiber, which desirably enhances the processing characteristics of the material, as well enhancing the characteristics of the finished composite product.

In accordance with the present invention, a method of making a fiber-reinforced cementitious composite comprising the steps of providing a cementitious composition, and providing cellulosic fibrous material. The present method further includes blending the cementitious composition and the cellulosic fibrous material to form a cementitious composite. As noted, the cellulosic fibrous material advantageously comprises surface enhanced pulp fiber, for enhancing processing and the finished composite product. In one aspect of the present invention, the surface enhanced pulp fiber comprises approximately 1-10%, by weight, of the cellulosic fibrous material. In another aspect, the cellulosic fibrous material exhibits an enhanced Bauer-McNett long fiber fraction.

In another aspect of the present invention, the cellulosic fibrous material exhibits at least a 10% increase in length—weighted average fiber length (LWAFL), in comparison to a cellulosic fibrous material which is devoid of surface enhanced pulp fiber. The cellulosic fibrous material requires relatively reduced refining energy, in comparison to a cellulosic fibrous material which is devoid of surface enhanced pulp fiber, to reach a predetermined freeness CSF (Canadian Standard Freeness) value.

In accordance with the present method, the surface enhanced pulp fiber has a length weighted average fiber length of at least about 0.2 millimeters, and an average hydrodynamic specific surface area of at least about 10 square meters per gram, wherein the number of surface enhanced pulp fibers is at least 12,000 fibers/milligram on an oven-dry basis. In another aspect of the invention, the surface enhanced pulp fiber has a length-weighted average fiber length that is at least 60% of the length-weighted average length of the fibers prior surface enhancement by fibrillation, and an average hydrodynamic specific surface area that is at least 4 times greater than the average specific surface area of the fibers prior to fibrillation. In another aspect, the surface enhanced pulp fibers are refined with an energy input of at least about 300 kilowatt-hours/ton.

The surface enhanced pulp fibers (SEPF) offers several unique benefits to aid and improve the manufacture and performance of cellulose-based fiber cement boards. These include both process-related and finished product improvements.

Greater toughness in the finished product, due to a significantly higher LWAFL in the finished product.

SEPF would be used as an additive, replacing approximately 6% of the conventional, long-fiber softwood that is currently exclusively used. In such a mixture this would lower the CSF of the blend. This, in turn, would require less refining in order to reach the desired freeness target for the Hatschek process. With less refining of the blend, a larger percentage of the longest fibers would be preserved. These long fibers provide cement boards with the required toughness and flexibility.

Our results showed a 17.6% increase in the Bauer-McNett long fiber fraction (+4, +14) with a 6% SEPF blend, co-refined to 450 CSF, compared to the conventional 100% softwood furnish.

Unrefined Northern Bleached Softwood Kraft (NBSK) has a FQA LWAFL of approximately 2.60 mm. Samples of the May 2012 furnishes tested at SUNY ESF show 100% SWD, Escher-Wyss refined to 483 CSF had a LWAFL of 2.08 mm. The sample with 6% SEPF, co-refined to 475 CSF had a LWAFL of 2.33 mm, a 0.25 mm or 12% increase in fiber length, compared to the 100% SWD control.

The longer fiber is especially valuable boards not pressed during manufacture to high density. Higher density improves strength, but makes the boards more brittle and more prone to damage in handling, and harder to nail.

Reduction in overall refining energy to reach the required freeness target.

In the initial round of laboratory testing of fiber cement boards, the Escher-Wyss refining energy of the various furnishes was measured. The 6% SEPF blend provided a 26% savings in refining energy.

By reducing the amount of refining required, there will also be a benefit of reduced refiner maintenance and longer refiner plate life.

Reduction in fiber costs.

In products where the increased fiber length of the SEPF blend is of no benefit, there could be a reduction in fiber costs by reducing the amount of softwood fiber and replacing it with shorter and lower cost cellulose fiber.

Increased retention of cement particles.

During the formation of the cement board, particles of cement can flow through the fiber cement board and enter the water system of the Hatschek machine. This can create a build-up of concrete in the process necessitating shutdowns to clean the process. The free cement particles can also enter the effluent system creating potential environmental issues. The enhanced surface properties of SEPF improve the ability of the fiber cement matt in trapping and retaining cement particles, thereby improving productivity and reducing maintenance and environmental issues.

It is believed that use of SEPF for creation of cementitious composite materials can desirably achieve a balance of conflicting fiber characteristics. On the one hand, maintaining fiber length is desirable since it acts to enhance the reinforcing characteristics of the fibers when used in cementitious composites. On the other hand, high pulp freeness facilitates water drainage during processing (a higher freeness value correlates to faster water drainage.) However, excessive drainage during formation of cementitious composites can result in undesirable drainage of cement particles, which cannot be readily reintroduced into the process in view of the tendency of the cement particles to initiate curing.

Thus, by use of SEPF, the desired fiber length is maintained, while the highly fibrillated nature and high surface area of the fibers desirably act to retain cement particles, while still permitting necessary drainage during manufacture of composite materials.

Notably, delivery of the SEPF material for use in subsequent processing can be facilitated by blending (ie, creating an admixture) of the SEPF material with conventional pump. A blend comprising approximately 10-30 percent, by weight, of SEPF with conventional pulp can be created, and them formed into bales or board material to facilitate efficient transport and use of the SEPF.

Experimental Results
1. Escher Wyss (E-W) refiningof unbleached Softwood, Hardwood
2. Cement boards manufactured at laboratory scale, test conditions T1 and T5, 8% total fiber content

| T-1 | 100% NBSK control | 475 CSF | 146.4 kWh/t |
|---|---|---|---|
| T-5 | 94% NBSK, 6% SEPF | 483 CSF | 108.3 kWh/t |

26% reduction in total refining energy
Fiber Length (tested at SUNY ESF)
Unrefined NBSK, 742 CSF-2.60 mm,
100% NBSK E-W refined to 483 CSF-2.08 mm
6% SEPF, 94% unrefined NBSK, co-refined to 475 CSF-2.33 mm

TABLE 2

Experimental Data for Test Conditions T1 and T5

| | | T1 Control 100% NBSK, 483 CSF | T5 Experimental 6% SEPF, 475 CSF |
|---|---|---|---|
| Modulus of Rupture (MOR) (eq.) | kg/cm² | 148.6 | 151.1 |
| MOR (wet) | kg/cm² | 114.0 | 113.1 |
| MOR (dry) | kg/cm² | 181.3 | 183.5 |
| MOE (eq.) | mPa | 5173 | 6830 |
| MOE (wet) | mPa | 6150 | 5710 |
| MOE (dry) | mPa | 8674 | |
| dry density | g/cm³ | 1.458 | 1.459 |
| Bauer/McNett, +4, +14 | % | 54.0 | 63.5 |
| wet br. Load @ 10 mm. defl. | Kgf | 10.2 | 13.3 |

Figure 3:
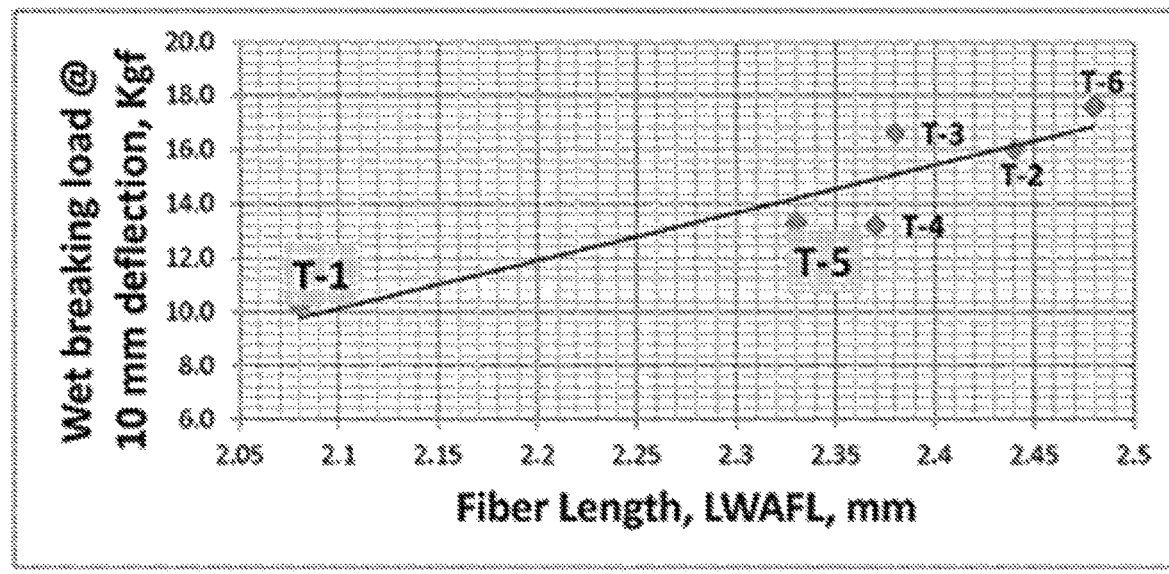
FIG. 3 is a graph plotting the wet breaking load of sample cement boards that incorporate pulp fibers against the length-weighted average fiber length of the pulp fibers incorporated therein.

FIG. 3 shows the effect of fiber length on wet breaking load.

TABLE 3

Effect of Bauer McNett Long Fiber Fraction on Wet Breaking Load for Test Conditions T1-T6

| Test Condition | Bauer McNett Long Fiber Fraction (%) | Wet Breaking Load (Kgf) |
|---|---|---|
| T1 | 53.99 | 10.2 |
| T2 | 68.46 | 16 |
| T3 | 67.23 | 16.6 |
| T4 | 65.55 | 13.2 |
| T5 | 63.5 | 13.3 |
| T6 | 68.26 | 17.6 |

Figure 4:
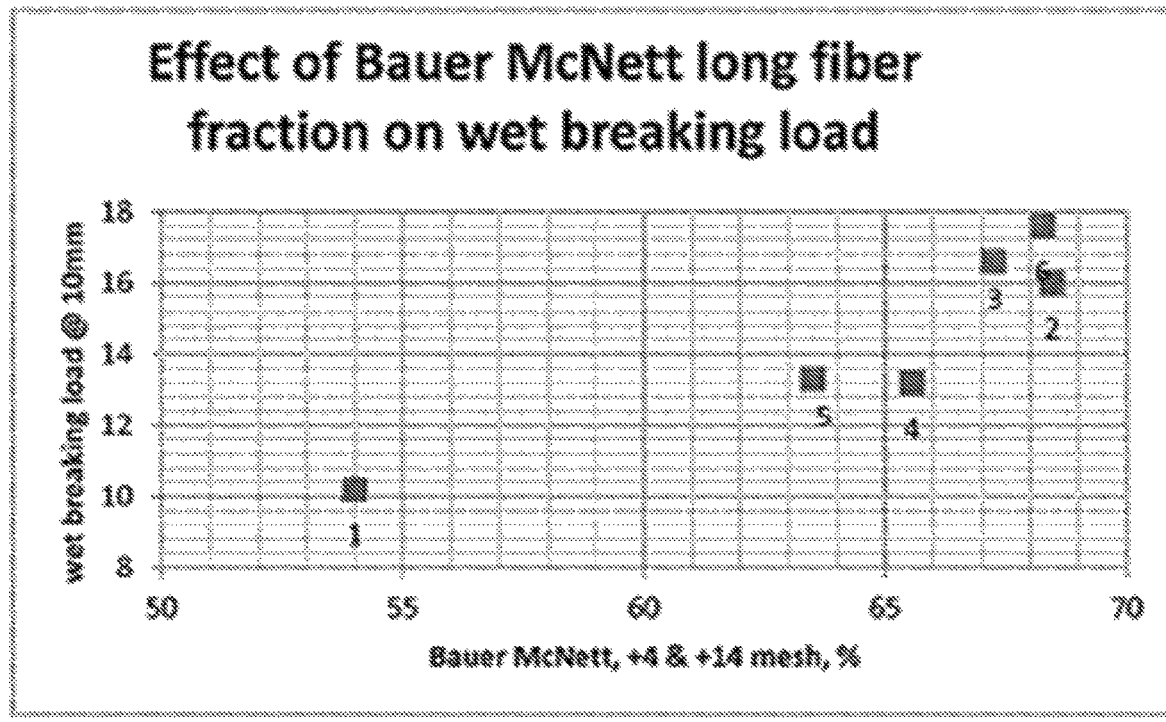
FIG. 4 is a graph plotting the wet breaking load of sample cement boards that incorporate pulp fibers against the Bauer McNett long fiber fraction of the pulp fibers incorporated therein.

FIG. 4 is a plot of the data of TABLE 3.

Embodiments of the present invention relate generally to surface enhanced pulp fibers, methods for producing, applying, and delivering surface enhanced pulp, products incorporating surface enhanced pulp fibers, and methods for producing, applying, and delivering products incorporating surface enhanced pulp fibers, and others as will be evident from the following description. The surface enhanced pulp fibers are fibrillated to an extent that provides desirable properties as set forth below and may be characterized as being highly fibrillated. In various embodiments, surface enhanced pulp fibers of the present invention have significantly higher surface areas without significant reductions in fiber lengths, as compared to conventional refined fibers, and without a substantial amount of fines being generated during fibrillation. Such surface enhanced pulp fibers can be useful in the production of pulp, paper, and other products as described herein.

The pulp fibers that can be surface enhanced according to embodiments of the present invention can originate from a variety of wood types, including hardwood and softwood. Non-limiting examples of hardwood pulp fibers that can be used in some embodiments of the present invention include, without limitation, oak, gum, maple, poplar, eucalyptus, aspen, birch, and others known to those of skill in the art. Non-limiting examples of softwood pulp fibers that can be used in some embodiments of the present invention include, without limitation, spruce, pine, fir, hemlock, southern pine, redwood, and others known to those of skill in the art. The pulp fibers may be obtained from a chemical source (e.g., a Kraft process, a sulfite process, a soda pulping process, etc.), a mechanical source, (e.g., a thermomechanical process (TMP), a bleached chemi-thermomechanical process (BCTMP), etc.), or combinations thereof. The pulp fibers can also originate from non-wood fibers such as linen, cotton, bagasse, hemp, straw, kenaf, etc. The pulp fibers can be bleached, partially bleached, or unbleached with varying degrees of lignin content and other impurities. In some embodiments, the pulp fibers can be recycled fibers or post-consumer fibers.

Surface enhanced pulp fibers according to various embodiments of the present invention can be characterized according to various properties and combinations of properties including, for example, length, specific surface area, change in length, change in specific surface area, surface properties (e.g., surface activity, surface energy, etc.), percentage of fines, drainage properties (e.g., Schopper-Riegler), crill measurement (fibrillation), water absorption properties (e.g., water retention value, wicking rate, etc.), and various combinations thereof. While the following description may not specifically identify each of the various combinations of properties, it should be understood that different embodiments of surface enhanced pulp fibers may possess one, more than one, or all of the properties described herein.

Some embodiments of the present invention relate to a plurality of surface enhanced pulp fibers. In some embodiments, the plurality of surface enhanced pulp fibers have a length weighted average fiber length of at least about 0.2 millimeters, preferably at least about 0.25 millimeters, with a length of about 0.3 millimeters being most preferred, wherein the number of surface enhanced pulp fibers is at least 12,000/milligram on an oven-dry basis. As used herein, "oven-dry basis" means that the sample is dried in an oven set at 105. degree. C. for 24 hours. In general, the longer the length of the fibers, the greater the strength of the fibers and the resulting product incorporating such fibers. Surface enhanced pulp fibers of such embodiments can be useful, for example, in papermaking applications. As used herein, length weighted average length is measured using a LDA02 Fiber Quality Analyzer or a LDA96 Fiber Quality Analyzer, each of which are from OpTest Equipment, Inc. of Hawkesbury, Ontario, Canada, and in accordance with the appropriate procedures specified in the manual accompanying the Fiber Quality Analyzer. As used herein, length weighted average length ($L_W$) is calculated according to the formula:

$$L_W = \Sigma n_i L_i^2 / \Sigma n_i L_i$$

wherein i refers to the category (or bin) number (e.g., 1, 2, ... N), $n_i$ refers to the fiber count in the $i^{th}$ category, and $L_i$ refers to contour length—histogram class center length in the $i^{th}$ category.

As noted above, one aspect of surface enhanced pulp fibers of the present invention is the preservation of the lengths of the fibers following fibrillation. In some embodiments, a plurality of surface enhanced pulp fibers can have a length weighted average length that is at least 60% of the length weighted average length of the fibers prior to fibrillation. A plurality of surface enhanced pulp fibers, according to some embodiments, can have a length weighted average length that is at least 70% of the length weighted average length of the fibers prior to fibrillation. In determining the percent length preservation, the length weighted average length of a plurality of fibers can be measured (as described above) both before and after fibrillation and the values can be compared using the following formula:

$$L_W(\text{before}) - L_W(\text{after}) / L_W(\text{before})$$

Surface enhanced pulp fibers of the present invention advantageously have large hydrodynamic specific surface areas which can be useful in some applications, such as papermaking. In some embodiments, the present invention relates to a plurality of surface enhanced pulp fibers wherein the fibers have an average hydrodynamic specific surface area of at least about 10 square meters per gram, and more preferably at least about 12 square meters per gram. For illustrative purposes, a typical unrefined papermaking fiber would have a hydrodynamic specific surface area of 2 m$^2$/g. As used herein, hydrodynamic specific surface area is measured pursuant to the procedure specified in Characterizing the drainage resistance of pulp and microfibrillar suspensions using hydrodynamic flow measurements, N. Lavrykova-Marrain and B. Ramarao, TAPPI's PaperCon 2012 Conference, available at http://www.tappi.org/Hide/Events/12PaperCon/Papers/12PAP116.aspx, which is hereby incorporated by reference.

One advantage of the present invention is that the hydrodynamic specific surface areas of the surface enhanced pulp fibers are significantly greater than that of the fibers prior to fibrillation. In some embodiments, a plurality of surface enhanced pulp fibers can have an average hydrodynamic specific surface area that is at least 4 times greater than the average specific surface area of the fibers prior to fibrillation, preferably at least 6 times greater than the average specific surface area of the fibers prior to fibrillation, and most preferably at least 8 times greater than the average specific surface area of the fibers prior to fibrillation. Surface enhanced pulp fibers of such embodiments can be useful, for example, in papermaking applications. In general, hydrodynamic specific surface area is a good indicator of surface activity, such that surface enhanced pulp fibers of the present invention, in some embodiments, can be expected to have good binding and water retention properties and can be expected to perform well in reinforcement applications.

As noted above, in some embodiments, surface enhanced pulp fibers of the present invention advantageously have increased hydrodynamic specific surface areas while preserving fiber lengths. Increasing the hydrodynamic specific surface area can have a number of advantages depending on the use including, without limitation, providing increased fiber bonding, absorbing water or other materials, retention of organics, higher surface energy, and others.

Embodiments of the present invention relate to a plurality of surface enhanced pulp fibers, wherein the plurality of surface enhanced pulp fibers have a length weighted average fiber length of at least about 0.2 millimeters and an average hydrodynamic specific surface area of at least about 10 square meters per gram, wherein the number of surface enhanced pulp fibers is at least 12,000/milligram on an oven-dry basis. A plurality of surface enhanced pulp fibers, in preferred embodiments, have a length weighted average fiber length of at least about 0.25 millimeters and an average hydrodynamic specific surface area of at least about 12 square meters per gram, wherein the number of surface enhanced pulp fibers is at least 12,000/milligram on an oven-dry basis. In a most preferred embodiment, a plurality of surface enhanced pulp fibers have a length weighted average fiber length of at least about 0.3 millimeters and an average hydrodynamic specific surface area of at least about 12 square meters per gram, wherein the number of surface enhanced pulp fibers is at least 12,000/milligram on an oven-dry basis. Surface enhanced pulp fibers of such embodiments can be useful, for example, in fiber cement applications.

In the refinement of pulp fibers to provide surface enhanced pulp fibers of the present invention, some embodiments preferably minimize the generation of fines. As used herein, the term "fines" is used to refer to pulp fibers having a length of 0.2 millimeters or less. In some embodiments, surface enhanced pulp fibers have a length weighted fines value of less than 40%, more preferably less than 22%, with less than 20% being most preferred. Surface enhanced pulp fibers of such embodiments can be useful, for example, in papermaking applications. As used herein, "length weighted fines value" is measured using a LDA02 Fiber Quality Analyzer or a LDA96 Fiber Quality Analyzer, each of which are from OpTest Equipment, Inc. of Hawkesbury, Ontario, Canada, and in accordance with the appropriate procedures specified in the manual accompanying the Fiber Quality Analyzer. As used herein, the percentage of length weighted fines is calculated according to the formula:

$$\% \text{ of length weighted fines} = 100 \times \Sigma n_i L_i / L_T$$

wherein n refers to the number of fibers having a length of less than 0.2 millimeters, $L_i$ refers to the fines class midpoint length, and $L_T$ refers to total fiber length.

Surface enhanced pulp fibers of the present invention simultaneously offer the advantages of preservation of length and relatively high specific surface area without, in preferred embodiments, the detriment of the generation of a large number of fines. Further, a plurality of surface enhanced pulp fibers, according to various embodiments, can simultaneously possess one or more of the other above-referenced properties (e.g., length weighted average fiber length, change in average hydrodynamic specific surface area, and/or surface activity properties) while also having a relatively low percentage of fines. Such fibers, in some embodiments, can minimize the negative effects on drainage while also retaining or improving the strength of products in which they are incorporated.

Other advantageous properties of surface enhanced pulp fibers can be characterized when the fibers are processed into other products and will be described below following a description of methods of making the surface enhanced pulp fibers.

Embodiments of the present invention also relate to methods for producing surface enhanced pulp fibers. The refining techniques used in methods of the present invention can advantageously preserve the lengths of the fibers while likewise increasing the amount of surface area. In preferred embodiments, such methods also minimize the amount of fines, and/or improve the strength of products (e.g., tensile strength, scott bond strength, wet-web strength of a paper product) incorporating the surface enhanced pulp fibers in some embodiments.

In one embodiment, a method for producing surface enhanced pulp fibers comprises introducing unrefined pulp fibers in a mechanical refiner comprising a pair of refiner plates, wherein the plates have a bar width of 1.3 millimeters or less and a groove width of 2.5 millimeters or less, and refining the fibers until an energy consumption of at least 300 kWh/ton for the refiner is reached to produce surface enhanced pulp fibers. Persons of ordinary skill in the art are familiar with the dimensions of bar width and groove width in connection with refiner plates. To the extent additional information is sought, reference is made to Christopher J. Biermann, Handbook of Pulping and Papermaking (2d Ed.1996) at p. 145, which is hereby incorporated by reference. The plates, in a preferred embodiment, have a bar width of 1.0 millimeters or less and a groove width of 1.6 millimeters or less, and the fibers can be refined until an energy consumption of at least 300 kWh/ton for the refiner is reached to produce surface enhanced pulp fibers. In a most preferred embodiment, the plates have a bar width of 1.0 millimeters or less and a groove width of 1.3 millimeters or less, and the fibers can be refined until an energy consumption of at least 300 kWh/ton for the refiner is reached to produce surface enhanced pulp fibers. As used herein and as understood by those of ordinary skill in the art, the references to energy consumption or refining energy herein utilize units of kWh/ton with the understanding that "/ton" or "per ton" refers to ton of pulp passing through the refiner on a dry basis. In some embodiments, the fibers are refined until an energy consumption of at least 650 kWh/ton for the refiner is reached. The plurality of fibers can be refined until they possess one or more of the properties described herein related to surface enhanced pulp fibers of the present invention. As described in more detail below, persons of skill in the art will recognize that refining energies significantly greater than 300 kWh/ton may be required for certain types of wood fibers and that the amount of refining energy needed to impart the desired properties to the pulp fibers may also vary.

In one embodiment, unrefined pulp fibers are introduced in a mechanical refiner comprising a pair of refiner plates or a series of refiners. The unrefined pulp fibers can include any of the pulp fibers described herein, such as, for example, hardwood pulp fibers or softwood pulp fibers or non-wood pulp fibers, from a variety of processes described herein (e.g., mechanical, chemical, etc.). In addition, the unrefined pulp fibers or pulp fiber source can be provided in a baled or slushed condition. For example, in one embodiment, a baled pulp fiber source can comprise between about 7 and about 11% water and between about 89 and about 93% solids. Likewise, for example, a slush supply of pulp fibers can comprise about 95% water and about 5% solids in one embodiment. In some embodiments, the pulp fiber source has not been dried on a pulp dryer.

Non-limiting examples of refiners that can be used to produce surface enhanced pulp fibers in accordance with some embodiments of the present invention include double disk refiners, conical refiners, single disk refiners, multi-disk refiners or conical and disk(s) refiners in combination. Non-limiting examples of double disk refiners include Beloit DD 3000, Beloit DD 4000 or Andritz DO refiners. Non-limiting example of a conical refiner are Sunds JCO1, Sunds JC 02 and Sunds JC03 refiners.

The design of the refining plates as well as the operating conditions are important in producing some embodiments of surface enhanced pulp fibers. The bar width, groove width, and groove depth are refiner plate parameters that are used to characterize the refiner plates. In general, refining plates for use in various embodiments of the present invention can be characterized as fine grooved. Such plates can have a bar width of 1.3 millimeters or less and a groove width of 2.5 millimeters or less. Such plates, in some embodiments, can have a bar width of 1.3 millimeters or less and a groove width of 1.6 millimeters or less. In some embodiments, such plates can have a bar width of 1.0 millimeters or less and a groove width of 1.6 millimeters or less. Such plates, in some embodiments, can have a bar width of 1.0 millimeters or less and a groove width of 1.3 millimeters or less. Refining plates having a bar width of 1.0 millimeters or less and a groove width of 1.6 millimeters or less may also be referred to as ultrafine refining plates. Such plates are available under the FINEBAR® brand from Aikawa Fiber Technologies (AFT). Under the appropriate operating conditions, such fine grooved plates can increase the number of fibrils on a pulp fiber (i.e., increase the fibrillation) while preserving fiber length and minimizing the production of fines. Conventional plates (e.g., bar widths of greater than 1.3 millimeters and/or groove widths of greater than 2.0 millimeters) and/or improper operating conditions can significantly enhance fiber cutting in the pulp fibers and/or generate an undesirable level of fines.

The operating conditions of the refiner can also be important in the production of some embodiments of surface enhanced pulp fibers. In some embodiments, the surface enhanced pulp fibers can be produced by recirculating pulp fibers which were originally unrefined through the refiner(s) until an energy consumption of at least about 300 kWh/ton is reached. The surface enhanced pulp fibers can be produced by recirculating pulp fibers which were originally unrefined through the refiner(s) until an energy consumption of at least about 450 kWh/ton is reached in some embodiments. In some embodiments the fibers can be recirculated in the refiner until an energy consumption of between about 450 and about 650 kWh/ton is reached. In some embodiments, the refiner can operate at a specific edge load between about 0.1 and about 0.3 Ws/m. The refiner can operate at a specific edge load of between about 0.15 and about 0.2 Ws/m in other embodiments. In some embodiments, an energy consumption of between about 450 and about 650 kWh/ton is reached using a specific edge load of between about 0.1 Ws/m and about 0.2 Ws/m to produce the surface enhanced pulp fibers. Specific edge load (or SEL) is a term understood to those of ordinary skill in the art to refer to the quotient of net applied power divided by the product of rotating speed and edge length. SEL is used to characterize the intensity of refining and is expressed as Watt-second/meter (Ws/m).

As described in more detail below, persons of skill in the art will recognize that refining energies significantly greater than 400 kWh/ton may be required for certain types of wood fibers and that the amount of refining energy needed to impart the desired properties to the pulp fibers may also vary. For example, Southern mixed hardwood fibers (e.g., oak, gum, elm, etc.) may require refining energies of between about 450-650 kWh/ton. In contrast, Northern hardwood fibers (e.g., maple, birch, aspen, beech, etc.) may require refining energies of between about 350 and about 500 kWh/ton as Northern hardwood fibers are less coarse than Southern hardwood fibers. Similarly, Southern softwood fibers (e.g., pine) may require even greater amounts of refining energy. For example, in some embodiments, refining Southern softwood fibers according to some embodiments may be significantly higher (e.g., at least 1000 kWh/ton).

The refining energy can also be provided in a number of ways depending on the amount of refining energy to be provided in a single pass through a refiner and the number of passes desired. In some embodiments, the refiners used in some methods may operate at lower refining energies per pass (e.g., 100 kWh/ton/pass or less) such that multiple passes or multiple refiners are needed to provide the specified refining energy. For example, in some embodiments, a single refiner can operate at 50 kWh/ton/pass, and the pulp fibers can be recirculated through the refiner for a total of 9 passes to provide 450 kWh/ton of refining. In some embodiments, multiple refiners can be provided in series to impart of refining energy.

In some embodiments where pulp fibers reach the desired refining energy by recirculating the fibers through a single refiner, the pulp fibers can be circulated at least two times through the refiner to obtain the desired degree of fibrillation. In some embodiments, the pulp fibers can be circulated between about 6 and about 25 times through the refiner to obtain the desired degree of fibrillation. The pulp fibers can be fibrillated in a single refiner by recirculation in a batch process.

In some embodiments, the pulp fibers can be fibrillated in a single refiner using a continuous process. For example, such a method can comprise, in some embodiments, continuously removing a plurality of fibers from the refiner, wherein a portion of the removed fibers are surface enhanced pulp fibers, and recirculating greater than about 80% of the removed fibers back to the mechanical refiner for further refining In some embodiments, greater than about 90% of the removed fibers can be recirculated back to the mechanical refiner for further refining. In such embodiments, the amount of unrefined fibers introduced to the refiner and the amount of fibers removed from the fiber without recirculation can be controlled such that a predetermined amount of fibers continually pass through the refiner. Put another way, because some amount of fibers are removed from the recirculation loop associated with the refiner, a corresponding amount of unrefined fibers should be added to the refiner in order to maintain a desired level of fibers circulating through the refiner. To facilitate the production of surface enhanced pulp fibers having particular properties (e.g., length weighted average fiber length, hydrodynamic specific surface area, etc.), the refining intensity (i.e., specific edge load) per pass will need to be reduced during the process as the number of passes increases.

In other embodiments, two or more refiners can be arranged in series to circulate the pulp fibers to obtain the desired degree of fibrillation. It should be appreciated that a variety of multi-refiner arrangements can be used to produce surface enhanced pulp fibers according to the present invention. For example, in some embodiments, multiple refiners can be arranged in series that utilize the same refining plates and operate under the same refining parameters (e.g., refining energy per pass, specific edge load, etc.). In some such embodiments, the fibers may pass through one of the refiners only once and/or through another of the refiners multiple times.

In one exemplary embodiment, a method for producing surface enhanced pulp fibers comprises introducing unrefined pulp fibers in a first mechanical refiner comprising a pair of refiner plates, wherein the plates have a bar width of 1.3 millimeters or less and a groove width of 2.5 millimeters or less, refining the fibers in the first mechanical refiner, transporting the fibers to at least one additional mechanical refiner comprising a pair of refiner plates, wherein the plates have a bar width of 1.3 millimeters or less and a groove width of 2.5 millimeters or less, and refining the fibers in the at least one additional mechanical refiner until a total energy consumption of at least 300 kWh/ton for the refiners is reached to produce surface enhanced pulp fibers. In some embodiments, the fibers can be recirculated through the first mechanical refiner a plurality of times. The fibers can be recirculated through an additional mechanical refiner a plurality of times in some embodiments. In some embodiments, the fibers can be recirculated through two or more of the mechanical refiners a plurality of times.

In some embodiments of methods for producing surface enhanced pulp fibers utilizing a plurality of refiners, a first mechanical refiner can be used to provide a relatively less fine, initial refining step and one or more subsequent refiners can be used to provide surface enhanced pulp fibers according to the embodiments of the present invention. For example, the first mechanical refiner in such embodiments can utilize conventional refining plates (e.g., bar width of greater than 1.0 mm and groove width of 1.6 mm or greater) and operate under conventional refining conditions (e.g., specific edge load of 0.25 Ws/m) to provide an initial, relatively less fine fibrillation to the fibers. In one embodiment, the amount of refining energy applied in the first mechanical refiner can be about 100 kWh/ton or less. After the first mechanical refiner, the fibers can then be provided to one or more subsequent refiners that utilizing ultrafine refining plates (e.g., bar width of 1.0 mm or less and groove width of 1.6 mm or less) and operate under conditions (e.g., specific edge load of 0.13 Ws/m) sufficient to produce surface enhanced pulp fibers in accordance with some embodiments of the present invention. In some embodiments, for example, the cutting edge length (CEL) can increase between refinement using conventional refining plates and refinement using ultrafine refining plates depending on the differences between the refining plates. Cutting Edge Length (or CEL) is the product of bar edge length and the rotational speed As set forth above, the fibers can pass through or recirculate through the refiners multiple times to achieve the desired refining energy and/or multiple refiners can be used to achieve the desired refining energy.

In one exemplary embodiment, a method for producing surface enhanced pulp fibers comprises introducing unrefined pulp fibers in a first mechanical refiner comprising a pair of refiner plates, wherein the plates have a bar width of greater than 1.0 millimeters and a groove width of 2.0 millimeters or greater. Refining the fibers in the first mechanical refiner can be used to provide a relatively less fine, initial refining to the fibers in some embodiments. After refining the fibers in the first mechanical refiner, the fibers are transported to at least one additional mechanical refiner comprising a pair of refiner plates, wherein the plates have a bar width of 1.0 millimeters or less and a groove width of 1.6 millimeters or less. In the one or more additional mechanical refiners, the fibers can be refined until a total energy consumption of at least 300 kWh/ton for the refiners is reached to produce surface enhanced pulp fibers. In some embodiments, the fibers are recirculated through the first mechanical refiner a plurality of times. The fibers are recirculated through the one or more additional mechanical refiner a plurality of times, in some embodiments.

With regard to the various methods described herein, the pulp fibers can be refined at low consistency (e.g., between 3 and 5%) in some embodiments. Persons of ordinary skill in the art will understand consistency to reference the ratio of oven dried fibers to the combined amount of oven dried fibers and water. In other words, a consistency of 3% would reflect for example, the presence of 3 grams of oven dried fibers in 100 milliliters of pulp suspension.

Other parameters associated with operating refiners to produce surface enhanced pulp fibers can readily be determined using techniques known to those of skill in the art. Similarly, persons of ordinary skill in the art can adjust the various parameters (e.g., total refining energy, refining energy per pass, number of passes, number and type of refiners, specific edge load, etc.) to produce surface enhanced pulp fibers of the present invention. For example, the refining intensity, or refining energy applied to the fibers per pass utilizing a multi-pass system, should be gradually reduced as the number of passes through a refiner increases in order to get surface enhanced pulp fibers having desirable properties in some embodiments.

Various embodiments of surface enhanced pulp fibers of the present invention can be incorporated into a variety of end products. Some embodiments of surface enhanced pulp fibers of the present invention can impart favorable properties on the end products in which they are incorporated in some embodiments. Non-limiting examples of such products include pulp, paper, paperboard, biofiber composites (e.g., fiber cement board, fiber reinforced plastics, etc.), absorbent products (e.g., fluff pulp, hydrogels, etc.), specialty chemicals derived from cellulose (e.g., cellulose acetate, carboxymethyl cellulose (CMC), etc.), and other products. Persons of skill in the art can identify other products in which the surface enhanced pulp fibers might be incorporated based particularly on the properties of the fibers. For example, by increasing the specific surface areas of surface enhanced pulp fibers (and thereby the surface activity), utilization of surface enhanced pulp fibers can advantageously increase the strength properties (e.g., dry tensile strength) of some end products while using approximately the same amount of total fibers and/or provide comparable strength properties in an end product while utilizing fewer fibers on a weight basis in the end product in some embodiments.

In addition to physical properties which are discussed further below, the use of surface enhanced pulp fibers according to some embodiments of the present invention can have certain manufacturing advantages and/or cost savings in certain applications. For example, in some embodiments, incorporating a plurality of surface enhanced pulp fibers according to the present invention into a paper product can lower the total cost of fibers in the furnish (i.e., by substituting high cost fibers with lower cost surface enhanced pulp fibers). For example, longer softwood fibers typically cost more than shorter hardwood fibers. In some embodiments, a paper product incorporating at least 2 weight percent surface enhanced pulp fibers according to the present invention can result in the removal of about 5% of the higher cost softwood fibers while still maintaining the paper strength, maintaining runnability of the paper machine, maintaining process performance, and improving print performance. A paper product incorporating between about 2 and about 8 weight percent surface enhanced pulp fibers according to some embodiments of the present invention can result in removal of about 5% and about 20% of the higher cost softwood fibers while maintaining the paper strength and improving print performance in some embodiments. Incorporating between about 2 and about 8 weight percent surface enhanced pulp fibers according to the present invention can help lower the cost of manufacturing paper significantly when compared to a paper product made in the same manner with substantially no surface enhanced pulp fibers in some embodiments.

One application in which surface enhanced pulp fibers of the present invention can be used, is paper products. In the production of paper products using surface enhanced pulp fibers of the present invention, the amount of surface enhanced pulp fibers used in the production of the papers can be important. For example, and without limitation, using some amount of surface enhanced pulp fibers can have the advantages of increasing the tensile strength and/or increasing the wet web strength of the paper product, while minimizing potential adverse effects such as drainage. In some embodiments, a paper product can comprise greater than about 2 weight percent surface enhanced pulp fibers (based on the total weight of the paper product). A paper product can comprise greater than about 4 weight percent surface enhanced pulp fibers in some embodiments. A paper product, in some embodiments, can comprise less than about 15 weight percent surface enhanced pulp fibers. In some embodiments, a paper product can comprise less than about 10 weight percent surface enhanced pulp fibers. A paper product can comprise between about 2 and about 15 weight percent surface enhanced pulp fibers in some embodiments. In some embodiments, a paper product can comprise between about 4 and about 10 weight percent surface enhanced pulp fibers. In some embodiments, the surface enhanced pulp fibers used in paper products can substantially or entirely comprise hardwood pulp fibers.

In some embodiments, when surface enhanced pulp fibers of the present invention are incorporated into paper products, the relative amount of softwood fibers that can be displaced is between about 1 and about 2.5 times the amount of surface enhanced pulp fibers used (based on the total weight of the paper product), with the balance of the substitution coming from conventionally refined hardwood fibers. In other words, and as one non-limiting example, about 10 weight percent of the conventionally refined softwood fibers can be replaced by about 5 weight percent surface enhanced pulp fibers (assuming a displacement of 2 weight percent of softwood fibers per 1 weight percent of surface enhanced pulp fibers) and about 5 weight percent conventionally refined hardwood fibers. Such substitution can occur, in some embodiments, without compromising the physical properties of the paper products.

With regard to physical properties, surface enhanced pulp fibers according to some embodiments of the present invention can improve the strength of a paper product. For example, incorporating a plurality of surface enhanced pulp fibers according to some embodiments of the present invention into a paper product can improve the strength of the final product. In some embodiments, a paper product incorporating at least 5 weight percent surface enhanced pulp fibers according to the present invention can result in higher wet-web strength and/or dry strength characteristics, can improve runnability of a paper machine at higher speeds, and/or can improve process performance, while also improving production. Incorporating between about 2 and about 10 weight percent surface enhanced pulp fibers according to the present invention can help improve the strength and performance of a paper product significantly when compared to a similar product made in the same manner with substantially no surface enhanced pulp fibers according to the present invention, in some embodiments.

As another example, a paper product incorporating between about 2 and about 8 weight percent surface enhanced pulp fibers according to some embodiments of the present invention, and with about 5 to about 20 weight percent less softwood fibers, can have similar wet tensile strength to a similar paper product with the softwood fibers and without surface enhanced pulp fibers. A paper product incorporating a plurality of surface enhanced pulp fibers according to the present invention can have a wet web tensile strength of at least 150 meters in some embodiments. In some embodiments, a paper product incorporating at least 5 weight percent surface enhanced pulp fibers, and 10% weight less softwood fibers, according to some embodiments of the present invention, can have a wet web tensile strength (at 30% consistency) of at least 166 meters. Incorporating between about 2 and about 8 weight percent surface enhanced pulp fibers according to the present invention can improve wet web tensile strength of a paper product when compared to a paper product made in the same manner with substantially no surface enhanced pulp fibers, such that some embodiments of paper products incorporating surface enhanced pulp fibers can have desirable wet-web tensile strengths with fewer softwood fibers. In some embodiments, incorporating at least about 2 weight percent surface enhanced pulp fibers of the present invention in a paper product can improve other properties in various embodiments including, without limitation, opacity, porosity, absorbency, tensile energy absorption, scott bond/internal bond and/or print properties (e.g., ink density print mottle, gloss mottle).

As another example, in some embodiments, a paper product incorporating a plurality surface enhanced pulp fibers according to the present invention can have a desirable dry tensile strength. In some embodiments, a paper product incorporating at least 5 weight percent surface enhanced pulp fibers can have a desirable dry tensile strength. A paper product incorporating between about 5 and about 15 weight percent surface enhanced pulp fibers according to the present invention can have a desirable dry tensile strength. In some embodiments, incorporating between about 5 and about 15 weight percent surface enhanced pulp fibers according to the present invention can improve dry tensile strength of a paper product when compared to a paper product made in the same manner with substantially no surface enhanced pulp fibers.

In some embodiments, incorporating at least about 5 weight percent surface enhanced pulp fibers of the present invention can improve other properties in various embodiments including, without limitation, opacity, porosity, absorbency, and/or print properties (e.g., ink density print mottle, gloss mottle, etc.).

In some embodiments of such products incorporating a plurality of surface enhanced pulp fibers, the improvements of certain properties, in some instances, can be proportionally greater than the amount of surface enhanced pulp fibers included. In other words, and as an example, in some embodiments, if a paper product incorporates about 5 weight percent surface enhanced pulp fibers, the corresponding increase in dry tensile strength may be significantly greater than 5%.

In addition to paper products which have been discussed above, in some embodiments, pulp incorporating a plurality of surface enhanced pulp fibers according to the present invention can have improved properties such as, without limitation, improved surface activity or reinforcement potential, higher sheet tensile strength (i.e., improved paper strength) with less total refining energy, improved water absorbency, and/or others.

As another example, in some embodiments, an intermediate pulp and paper product (e.g., fluff pulp, reinforcement pulp for paper grades, market pulp for tissue, market pulp for paper grades, etc.), incorporating between about 1 and about 10 weight percent surface enhanced pulp fibers can provide improved properties. Non-limiting examples of improved properties of intermediate pulp and paper products can include increased wet web tensile strength, a comparable wet web tensile strength, improved absorbency, and/or others.

As another example, in some embodiments, an intermediate paper product (e.g., baled pulp sheets or rolls, etc.), incorporating surface enhanced pulp fibers can provide a disproportionate improvement in final product performance and properties, with at least 1 weight percent surface enhanced pulp fibers being more preferred. In some embodiments, an intermediate paper product can incorporate between 1 weight percent and 10 weight percent surface enhanced pulp fibers. Non-limiting examples of improved properties of such intermediate paper products can include, increased wet web tensile strength, better drainage properties at comparable wet web tensile strength, improved strength at a similar hardwood to softwood ratio, and/or comparable strength at higher hardwood to softwood ratio.

In manufacturing paper products according to some embodiments of the present invention, surface enhanced pulp fibers of the present invention can be provided as a slipstream in a conventional paper manufacturing process. For example, surface enhanced pulp fibers of the present invention can be mixed with a stream of hardwood fibers refined using conventional refining plates and under conventional conditions. The combination stream of hardwood pulp fibers can then be combined with softwood pulp fibers and used to produce paper using conventional techniques.

Other embodiments of the present invention relate to paperboards that comprise a plurality of surface enhanced pulp fibers according to some embodiments of the present invention. Paperboards according to embodiments of the present invention can be manufactured using techniques known to those of skill in the art except incorporating some amount of surface enhanced pulp fibers of the present invention, with at least 2% surface enhanced pulp fibers being more preferred. In some embodiments, paperboards can be manufactured using techniques known to those of skill in the art except utilizing between about 2% and about 3% surface enhanced pulp fibers of the present invention.

Other embodiments of the present invention also relate to bio fiber composites (e.g., fiber cement boards, fiber reinforced plastics, etc.) that includes a plurality of surface enhanced pulp fibers according to some embodiments of the present invention. Fiber cement boards of the present invention can generally be manufactured using techniques known to those of skill in the art except incorporating surface enhanced pulp fibers according to some embodiments of the present invention, at least 3% surface enhanced pulp fibers being more preferred. In some embodiments, fiber cement boards of the present invention can generally be manufactured using techniques known to those of skill in the art except utilizing between about 3% and about 5% surface enhanced pulp fibers of the present invention.

Other embodiments of the present invention also relate to water absorbent materials that comprise a plurality of surface enhanced pulp fibers according to some embodiments of the present invention. Such water absorbent materials can be manufactured using techniques known to those of skill in the art utilizing surface enhanced pulp fibers according to some embodiments of the present invention. Non-limiting examples of such water absorbent materials include, without limitation, fluff pulps and tissue grade pulps.

FIG. 1 illustrates one exemplary embodiment of a system that can be used to make paper products incorporating surface enhanced pulp fibers of the present invention. An unrefined reservoir 100 containing unrefined hardwood fibers, for example in the form of a pulp base, is connected to a temporary reservoir 102, which is connected to a fibrillation refiner 104 in a selective closed circuit connection. As mentioned above, in a particular embodiment, the fibrillation refiner 104 is a refiner that is set up with suitable parameters to produce the surface enhanced pulp fibers described herein. For example, the fibrillation refiner 104 can be a dual disk refiner with pair of refining disks each having a bar width of 1.0 millimeters and a groove width of 1.3 millimeters, and with a specific edge load of about 0.1-0.3 Ws/m. The closed circuit between the temporary reservoir 102 and fibrillation refiner 104 is maintained until the fibers have circulated through the refiner 104 a desired number of times, for example until an energy consumption of 400-650 kWh/ton is reached.

An exit line extends from the fibrillation refiner 104 to a storage reservoir 105, this line remaining closed until the fibers have circulated through the refiner 104 an adequate number of times. The storage reservoir 105 is in connection with a flow exiting from a conventional refiner 110 set up with conventional parameters to produce conventional refined fibers. In some embodiments, the storage reservoir 105 is not utilized and the fibrillation refiner 104 is in connection with the flow exiting from the conventional refiner 110.

In a particular embodiment, the conventional refiner 110 is also connected to the unrefined reservoir 100, such that a single source of unrefined fibers (e.g., a single source of hardwood fibers) is used in both the refining and fibrillation processes. In another embodiment, a different unrefined reservoir 112 is connected to the conventional refiner 110 to provide the conventional refined fibers. In this case, both reservoirs 100, 112 can include similar or different fibers therein.

It is understood that all the connections between the different elements of the system may include pumps (not shown) or other suitable equipment for forcing the flow therebetween as required, in addition to valves (not shown) or other suitable equipment for selectively closing the connection where required. Also, additional reservoirs (not shown) may be located in between successive elements of the system.

In use and in accordance with a particular embodiment, the unrefined fibers are introduced in a mechanical refining process where a relatively low specified edge load (SEL), for example about 0.1-0.3 Ws/m, is applied thereon, for example through the refining plates described above. In the embodiment shown, this is done by circulating the unrefined fibers from the reservoir 100 to the temporary reservoir 102, and then between the fibrillation refiner 104 and the temporary reservoir 102. The mechanical refining process is continued until a relatively high energy consumption is reached, for example about 450-650 kWh/ton. In the embodiment shown, this is done by recirculating the fibers between the fibrillation refiner 104 and temporary reservoir 102 until the fibers have gone through the refiner 104 "n" times. In one embodiment, n is at least 3, and in some embodiments may be between 6 and 25. n can be selected to provide surface enhanced pulp fibers with properties (e.g., length, length weighted average, specific surface area, fines, etc.) for example within the given ranges and/or values described herein.

The surface enhanced pulp fiber flow then exits the fibrillation refiner 104, to the storage reservoir 105. The surface enhanced pulp fiber flow exits the storage reservoir 105 and is then added to a flow of conventional refined fibers having been refined in a conventional refiner 110 to obtain a stock composition for making paper. The proportion between the surface enhanced pulp fibers and the conventional refined fibers in the stock composition may be limited by the maximum proportion of surface enhanced pulp fibers that will allow for adequate properties of the paper produced. In one embodiment, between about 4 and 15% of the fiber content of the stock composition is formed by the surface enhanced pulp fibers (i.e., between about 4 and 15% of the fibers present in the stock composition are surface enhanced pulp fibers). In some embodiments, between about 5 and about 10% of the fibers present in the stock composition are surface enhanced pulp fibers. Other proportions of surface enhanced pulp fibers are described herein and can be used.

The stock composition of refined fibers and surface enhanced pulp fibers can then be delivered to the remainder of a papermaking process where paper can be formed using techniques known to those of skill in the art.

Figure 2:
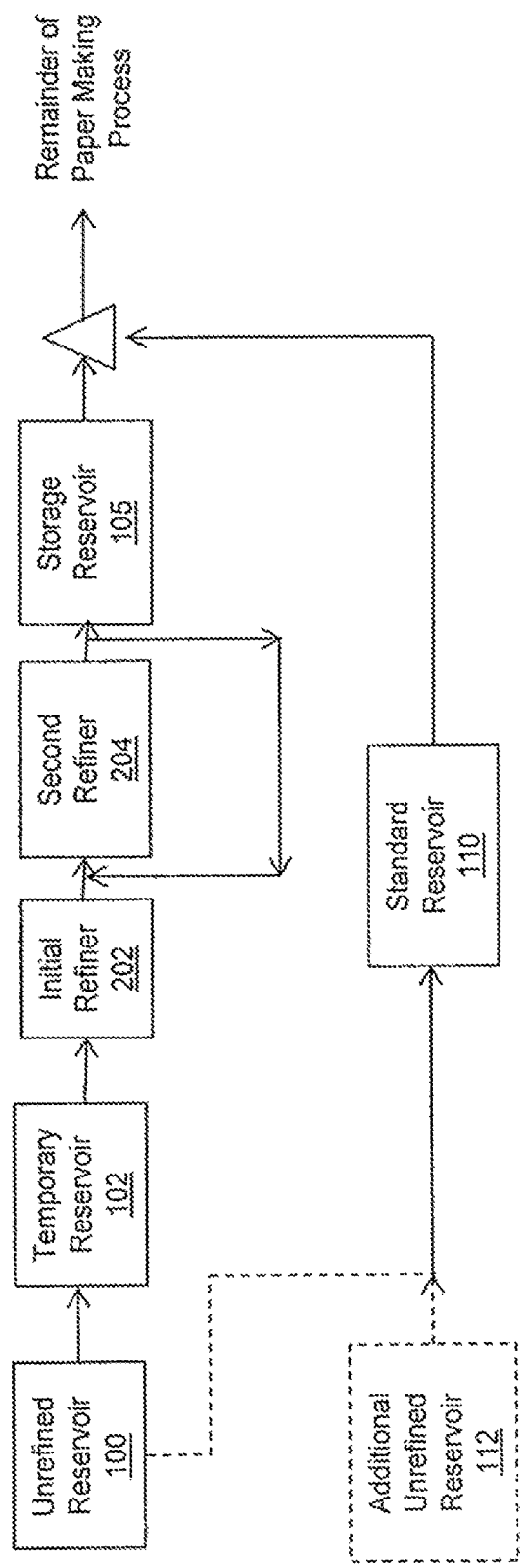
FIG. 2 is a block diagram illustrating a system for making a paper product that includes a second refiner according to one non-limiting embodiment of the present invention.

FIG. 2 illustrates a variation of the exemplary embodiment shown in FIG. 1 in which the the fibrillation refiner 104 has been replaced two refiners 202,204 arranged in series. In this embodiment, the initial refiner 202 provides a relatively less fine, initial refining step, and the second refiner 204 continues to refine the fibers to provide surface enhanced pulp fibers. As shown in FIG. 2, the fibers can be recirculated in the second refiner 204 until the fibers have circulated through the refiner 204 a desired number of times, for example until a desired energy consumption is reached. Alternatively, rather than recirculating the fibers in the second refiner 204, additional refiners may be arranged in series after the second refiner 204 to further refine the fibers, and any such refiners can include a recirculation loop if desired. While not shown in FIG. 1, depending on the energy output of the initial refiner 202, and the desired energy to be applied to the fibers in the initial refinement stage, some embodiments may include recirculation of the fibers through the initial refiner 202 prior to transport to the second refiner 204. The number of refiners, the potential use of recirculation, and other decisions related to arrangement of refiners for providing surface enhanced pulp fibers can depend on a number of factors including the amount of manufacturing space available, the cost of refiners, any refiners already owned by the manufacturer, the potential energy output of the refiners, the desired energy output of the refiners, and other factors.

In one non-limiting embodiment, the initial refiner 202 can utilize a pair of refining disks each having a bar width of 1.0 millimeters and a groove width of 2.0 millimeters. The second refiner 204 can have a pair of refining disks each having a bar width of 1.0 millimeters and a groove width of 1.3 millimeters. The fibers, in such an embodiment, can be refined in the first refiner at a specific edge load of 0.25 Ws/m until a total energy consumption of about 80 kWh/ton is reached. The fibers can then be transported to the second refiner 204 where they can be refined and recirculated at a specific edge load of 0.13 Ws/m until a total energy consumption of about 300 kWh/ton is reached.

The remaining steps and features of the system embodiment shown in FIG. 2 can be the same as those in FIG. 1.

General

Unless indicated to the contrary, the numerical parameters set forth in this specification are approximations that can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10. Additionally, any reference referred to as being "incorporated herein" is to be understood as being incorporated in its entirety.

It is further noted that, as used in this specification, the singular forms "a," "an," and "the" include plural referents unless expressly and unequivocally limited to one referent.

U.S. Patent Application No. 2014/0057105, published Feb. 27, 2014, is hereby incorporated by reference.

It is to be understood that the present description illustrates aspects of the invention relevant to a clear understanding of the invention. Certain aspects of the invention that would be apparent to those of ordinary skill in the art and that, therefore, would not facilitate a better understanding of the invention have not been presented in order to simplify the present description. Although the present invention has been described in connection with certain embodiments, the present invention is not limited to the particular embodiments disclosed, but is intended to cover modifications that are within the spirit and scope of the invention, as defined by the appended claims.

What is claimed is:

1. A method of making a fiber-reinforced cementitious composite, the method comprising the steps of:

providing a cementitious composition;
providing cellulosic fibrous material; and
blending the cementitious composition and the cellulosic fibrous material to form a cementitious composite,
wherein the cellulosic fibrous material comprises surface enhanced pulp fibers formed from a hardwood, and wherein the surface enhanced pulp fibers have a length-weighted average fiber length of at least about 0.2 millimeters, and an average hydrodynamic specific surface area of at least about 10 square meters per gram, wherein the number of surface enhanced pulp fibers is at least 12,000 fibers/milligram on an oven-dry basis.

2. The method of claim 1, wherein the surface enhanced pulp fibers comprise approximately 1-10%, by weight, of the cellulosic fibrous material.

3. The method of claim 2, wherein the cellulosic fibrous material comprises between about 90 to 99%, by weight, softwood pulp fibers, and further comprising co-refining the softwood pulp fibers and the surface enhanced pulp fibers.

4. The method of claim 3, wherein the cellulosic fibrous material comprises about 6% to 10%, by weight, surface enhanced pulp fibers.

5. The method of claim 3, wherein the softwood pulp fibers and the surface enhanced pulp fibers are co-refined to a freeness between 450 and 490 Canadian Standard Freeness (CSF).

6. The method of claim 2, wherein the cellulosic fibrous material exhibits an enhanced Bauer-McNett long fiber fraction.

7. The method of claim 3, wherein the cellulosic fibrous material has a Bauer-McNett long fiber fraction that is at least 15% higher than a Bauer-McNett long fiber fraction of a furnish comprising 100% softwood pulp fibers.

8. The method of claim 1, wherein the cellulosic fibrous material has a length-weighted average fiber length that is at least 10% higher than a length-weighted average fiber length of a cellulosic fibrous material which is devoid of surface enhanced pulp fibers.

9. The method of claim 3, wherein refining is performed such that the cellulosic fibrous material reaches a predetermined freeness using a refining energy that is at least 25% lower than a refining energy required for a cellulosic fibrous material which is devoid of surface enhanced pulp fibers to reach the predetermined freeness.

10. The method of claim 1, wherein the surface enhanced pulp fibers have a length-weighted average fiber length of at least about 0.3 millimeters.

11. The method of claim 1, wherein the surface enhanced pulp fibers have a length-weighted average fiber length that is at least 60% of the length-weighted average length of the fibers prior surface enhancement by fibrillation, and an average hydrodynamic specific surface area that is at least 4 times greater than the average specific surface area of the fibers prior to fibrillation.

12. The method of claim 1, wherein the surface enhanced pulp fibers are refined with an energy input of at least about 300 kilowatt-hours/ton.

13. A fiber-reinforced cementitious composite, comprising:

a blend of a cementitious composition and cellulosic fibrous material,
wherein the cellulosic fibrous material comprises surface enhanced pulp fibers formed from a hardwood, and wherein the surface enhanced pulp fibers have a length-weighted average fiber length of at least about 0.2 millimeters, and an average hydrodynamic specific surface area of at least about 10 square meters per gram, wherein the number of surface enhanced pulp fibers is at least 12,000 fibers/milligram on an oven-dry basis.

14. The cementitious composite of claim 13, wherein the surface enhanced pulp fibers comprise approximately 1-10%, by weight, of the cellulosic fibrous material.

15. The cementitious composite of claim 14, wherein the cellulosic fibrous material comprises between about 90 to 99%, by weight, softwood pulp fibers that are co-refined with the surface enhanced pulp fibers.

16. The cementitious composite of claim 15, wherein the cellulosic fibrous material comprises about 6% to 10%, by weight, surface enhanced pulp fibers.

17. The cementitious composite of claim 16, wherein the softwood pulp fibers and the surface enhanced pulp fibers are co-refined to a freeness between 450 and 490 Canadian Standard Freeness (CSF).

18. The cementitious composite of claim 14, wherein the cellulosic fibrous material exhibits an enhanced Bauer-McNett long fiber fraction.

19. The cementitious composite of claim 15, wherein the cellulosic fibrous material has a Bauer-McNett long fiber fraction that is at least 15% higher than a Bauer-McNett long fiber fraction of a furnish comprising 100% softwood pulp fibers.

20. The cementitious composite of claim 13, wherein the cellulosic fibrous material has a length-weighted average fiber length that is at least 10% higher than a length-weighted average fiber length of a cellulosic fibrous material which is devoid of surface enhanced pulp fibers.

21. The cementitious composite of claim 13, wherein the surface enhanced pulp fibers have a length-weighted average fiber length of at least about 0.3 millimeters.

22. The cementitious composite of claim 13, wherein the surface enhanced pulp fibers have a length-weighted average fiber length that is at least 60% of the length-weighted average length of the fibers prior surface enhancement by fibrillation, and an average hydrodynamic specific surface area that is at least 4 times greater than the average specific surface area of the fibers prior to fibrillation.

23. The cementitious composite of claim 13, wherein the surface enhanced pulp fibers are refined with an energy input of at least about 300 kilowatt-hours/ton.

* * * * *